106. COMPOSITIONS,
COATING OR PLASTIC.

Patented Nov. 11, 1930

1,781,267

UNITED STATES PATENT OFFICE

RICHARD BUHMAN, OF CASPER, WYOMING

COMPOUND FOR MIXING WITH CEMENTS AND METHOD OF MAKING THE SAME

No Drawing.    Application filed April 5, 1924.    Serial No. 704,318.

The present invention relates to a process of cementing wells and a composition of matter for mixing with the cement which is used for the foregoing or similar purposes where it is desired to retard the initial set of the cement and at the same time hasten the final set of the cement.

In the drilling of oil wells it sometimes happens that a stratum of water bearing sand is encountered before the stratum of oil bearing sand is reached, and it then becomes necessary to cement the well and seal off the water bearing sand so that the water will not leak into the well and interfere with obtaining the oil from the underlying stratum of oil bearing sand.

This is ordinarily accomplished by pumping a mixture of cement and water, termed cement slurry, down through the casing and causing it to pass around the lower edge of the casing and rise into the space between the exterior of the casing and the walls of the hole. After the cement slurry has thus been forcibly pumped into position and the job is completed, it would ordinarily require a considerable period of time, as from eight to fourteen days, for the cement to set and harden. Drilling cannot be resumed until the cement has hardened, and obviously it is an advantage to accelerate the hardening of the cement in order to reduce the loss of time and cut down the delay before drilling can be continued.

This desired acceleration of the hardening of the cement can be accomplished by adding certain chemicals to the cement and, of those that have been used up to the present time calcium chloride seems to be the most popular. The difficulty with all of the accelerators that have been used, and especially with calcium chloride, is that they begin to work as soon as the cement is mixed with water, and as the operation of cementing a well requires from one to three hours, during which time the cement slurry must be fluid enough to be pumped, it may easily, and frequently does happen, that the cement begins to set and harden in the casing and even in the pump before the job is completed. One way to avoid this is to make the slurry so thin that the initial set is delayed long enough to complete the operation, although this is a serious drawback, as the excess of water must either settle out or be absorbed by the calcium chloride if any acceleration of the hardening is to be accomplished. Furthermore, any excess of water makes the slurry so thin that the cement settles out very rapidly where it is not desired to settle out, and the portion that has thus settled being without excess water sets very rapidly due to the dehydrating action of calcium chloride. This is frequently the cause of the cement hardening in the pump and casing before the job is completed. Thus if the cement slurry containing calcium chloride is thin enough for safe operation, the cement tends to settle out, and the settled out portion hardens very rapidly. But it is very doubtful if enough settling occurs in the hole to be of benefit, if there is a column of 500 feet or more, and this is being agitated until the job is completed. If the job requires from one to two hours for completion, the cement will begin to set soon after, although slowly with the excess of water present, but fast enough to largely prevent this excess of water from separating out on top. In this way the purpose of the calcium chloride is partly defeated, as it has first to absorb the excess of water that its very introduction made necessary.

According to the present invention this difficulty is solved by providing for retarding the initial set of the cement so that there is ample time for getting the cement in position and finishing the job before the cement starts to harden, and at the same time hastening or accelerating the final set of the cement, so that the loss of time before drilling can be resumed will be reduced to a minimum.

With the foregoing thoughts in mind it will be understood that the present invention comprises a process of cementing wells, and also a compound for mixing with cements, whereby the initial set is delayed and the final set accelerated, and the necessity of using an excessive quantity of water in the mixing of a cement slurry avoided.

In forming the slurry cement is ordinarily mixed with about 50% by weight of water in order to give a slurry that is just liquid enough to be pumped. Obviously, the amount of water used is important, since too much will delay the setting of the cement, and too little will make the pumping difficult. The operation of pumping the cement slurry in forcing it into position in the space surrounding the casing ordinarily requires from one to three hours and sometimes even longer, depending upon conditions, and, of course, premature setting of the cement would be fatal to the job. Where calcium chloride alone is used with the cement to accelerate the setting, the setting sometimes begins before the job is completed, with the result that the cement may harden in the casing or in the pump. When this happens it is usually necessary to stop operations, drill the cement out of the casing and start all over again.

According to the present invention a reagent is added to the cement which serves to delay the initial set and accelerate the final hardening of the cement. This reagent also allows the use of a smaller quantity of water in the slurry and tends to prevent the settling out of the cement from the slurry. It will thus be seen that the addition of this single reagent will overcome all of the difficulty caused by the addition of calcium chloride to the cement for the purpose of causing an early hardening thereof. This reagent may or may not be used in combination with calcium chloride, and it will improve the quality of the cement by making it tougher and, therefore, less liable to crack when subjected to the pounding of the drill.

This reagent, which may or may not be used in connection with calcium chloride, comprises a soluble iron or aluminum salt. These salts are added to the gauging water used in making the cement slurry, and must be such that the corresponding calcium salts which are automatically formed in the cement on the addition of the water thereto crystallize with relatively large amounts of water, such as chlorides, nitrates and sulphates.

The foregoing result is accomplished in the following manner. When cement is mixed with water, calcium hydroxide is set free. If the water contains a soluble iron salt, a reaction takes place by which the insoluble iron hydroxide and a soluble calcium salt are produced, according to the following reaction:

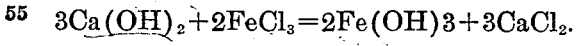
$$3Ca(OH)_2 + 2FeCl_3 = 2Fe(OH)_3 + 3CaCl_2.$$

By the formation of iron hydroxide in the cement during and after the mixing with water, and the resulting intimate and uniform distribution of the iron hydroxide, sufficient moisture is retained uniformly throughout the cement to retard the initial set of the cement, even in the presence of drying agents, such as calcium chloride. By varying the amount of the iron salt used, the length of time the initial set is retarded, can be controlled to suit the requirements.

According to the foregoing reaction calcium chloride is slowly formed in the cement, and as this crystallizes with a relatively large amount of water, it acts as a dehydrating agent and hastens the final set or hardening of the cement. It has been found in actual practice that the addition of iron chloride to the gauging water of the cement with or without the addition of calcium chloride acts in the dual capacity of first retarding and later hastening the hardening of the cement. Both of these qualities are highly desirable in the cementing of oil wells and other analogous operations, because it allows, in the first place, more time for placing the cement and in the second place, there is less delay before drilling can be resumed. The formation of iron hydroxide in the cement acts as an internal lubricant and makes a more uniform and creamy slurry. The iron hydroxide also tends to prevent the segregation of finer and coarser particles of the cement and the settling out of the cement from the water. It also makes the cement easier and safer to pump, with less tendency to clog the valves, and after the cement has finally hardened it is tough and thoroughly water-proof and will not crack under the pounding action of the drills.

It has been found that iron and aluminum salts act similarly and aluminum chloride can be used instead of the ferric chloride with substantially the same results. In fact, any soluble metallic salt can be used which is of such a character as to form an insoluble metallic hydroxide in reaction with the cement. I do not wish to restrict myself to the use of either ferric chloride or aluminum chloride, or to any particular metallic salt, since any metallic salt which is soluble and will react with the cement in the same manner as the ferric chloride to produce metallic hydroxide and bring about a slow formation of calcium chloride can be used. These salts can be used either singularly or in mixture with each other, and they can be used either with or without calcium chloride.

In practice it has been found that 1.5% of commercial calcium chloride with 1% of commercial ferric chloride, by weight in terms of dry cement, gives good results, although under certain conditions it may be desirable to use up to 3% or even more of both the metallic salt and calcium chloride. The quantity to be used is necessarily subject to variation to suit different conditions. The ferric chloride or other metallic salt can be used without the calcium chloride if desired, although it has been found advantageous to use a mixture of calcium chloride and ferric chloride, since the calcium chloride is cheaper and more effective in accelerating the final hardening, while the ferric chlorides operate to retard the initial set.

Having thus described my invention what I claim as new and desire to secure by Letters Patent is,

The method of preparing a cement for use in cementing off oil wells or the like, which comprises first making a cement of usual mix, adding calcium chloride to act as a dehydrating agent and also ferric chloride which will react with the cement to result in the formation of an additional quantity of calcium chloride, and a hydroxide which acts as an initial set retarding agent.

In testimony whereof I affix my signature.

RICHARD BUHMAN.